United States Patent
Miyahara

(10) Patent No.: US 6,738,211 B2
(45) Date of Patent: May 18, 2004

(54) RECORDING AND REPRODUCING APPARATUS

(75) Inventor: Kazuhiro Miyahara, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 235 days.

(21) Appl. No.: 09/878,932

(22) Filed: Jun. 12, 2001

(65) Prior Publication Data

US 2002/0027734 A1 Mar. 7, 2002

(30) Foreign Application Priority Data

Aug. 31, 2000 (JP) ........................................ 2000-263430

(51) Int. Cl.$^7$ ............................................... G11B 19/04
(52) U.S. Cl. .............................. 360/60; 360/61; 360/29; 360/39
(58) Field of Search ............................ 386/98, 46, 67; 369/47.41; 710/240; 360/32, 60, 53, 15, 61

(56) References Cited

U.S. PATENT DOCUMENTS

| | | | | |
|---|---|---|---|---|
| 5,295,023 A | * | 3/1994 | Sekii | 360/32 |
| 5,315,448 A | * | 5/1994 | Ryan | 360/60 |
| 5,414,859 A | * | 5/1995 | Staudacher et al. | 710/240 |
| 5,982,726 A | * | 11/1999 | Ro et al. | 369/47.41 |
| 6,014,492 A | * | 1/2000 | Kim et al. | 386/67 |
| 6,266,477 B1 | * | 7/2001 | Ichinoi | 386/46 |
| 6,397,000 B1 | * | 5/2002 | Hatanaka et al. | 386/98 |
| 6,437,933 B1 | * | 8/2002 | Sugiyama et al. | 360/69 |

FOREIGN PATENT DOCUMENTS

JP    3-125375    5/1991

* cited by examiner

Primary Examiner—David Hudspeth
Assistant Examiner—Glenda P. Rodriguez
(74) Attorney, Agent, or Firm—RatnerPrestia

(57) ABSTRACT

Automatic-signal-selecting is provided for controlling which output is supplied from a switch, i.e., a digital signal or an analog signal. The control is carried out based on information selected by manual-signal-selecting and information judged by copyright-information-judging. This structure allows a recording and reproducing apparatus to record the content-prohibited from being recorded in a digital form according to copyright information-in an analog form.

4 Claims, 3 Drawing Sheets

RECORDING AND REPRODUCING APPARATUS

FIELD OF THE INVENTION

The present invention relates to a recording and reproducing apparatus, such as a video tape recorder, which records and reproduces a digitally modulated signal (hereinafter referred to as a digital signal) and an analog signal.

BACKGROUND OF THE INVENTION

Recently, digitalization has been progressed in broadcasting systems, and recording media as well as formats which can record video and audio materials with digital signals as they are have been developed. There is D-VHS format which can record and reproduce both of digital signals and analog signals. (D-VHS is one of the trademarks of Japan Victor Co., Ltd.) A content can be recorded with analog signals but should not be recorded with digital signals, and whether or not recordable depends on the contents of digital broadcasting. When a transfer rate of a digital signal transmitted is over the maximum transfer rate of a recording medium or a format, the digital signal cannot be recorded.

A conventional recording and reproducing apparatus, which can record and reproduce both of digital signals and analog signals, is described hereinafter with reference to FIG. 3.

In FIG. 3, digital-signal-inputting-means 31 supplies a digital signal to digital-signal-processing-means 32, i.e., processing means 32 receives the digital signal from inputting means 31, then processing means 32 processes various information of the signal, and outputs the process result to digital-signal-demodulating-means 33. Demodulating means 33 demodulates the digital signals of video and audio extracted by processing means 32 into analog signals. Switch 34 receives both of the digital signals of the video and audio from processing means 32 and the analog signals of the video and audio demodulated by demodulating means 33. Then switch 34 selects one of these two kinds of signals based on a control signal supplied from manual-signal-selecting means 35 and outputs the selected signals. Selecting means 35 can manually set the signal selection at switch 34.

Copyright information judging means 36 judges the copyright information extracted by processing means 32. Recording processing means 37 records the digital signal or analog signal output from switch 34. At this time, processing means 37 carries out digital recording or analog recording responsive to the selection of selecting means 35. However, when judging means 36 judges that the copyright information includes prohibition against digital recording, processing means 37 cannot practice digital recording. When processing means 37 can record the content, processing means 37 actually records signals in recording medium 38. Reproduction processing means 39 reproduces the signal recorded in medium 38. Reproduction signal outputting means 310 outputs the signals reproduced by reproduction processing means 39.

An operation of the conventional recording and reproducing apparatus structured above is described hereinafter.

First, a digital signal supplied from inputting means 31 is sent to digital-signal-processing means 32, where necessary data is extracted. At this time, processing means 32 transmits digital signals of video and audio to digital-signal-demodulating means 33 and switch 34. Processing means 32 transmits various data-signals to copyright information judgement means 36. Demodulating means 33 demodulates the digital signal received to an analog signal, then transmits the demodulated analog signal to switch 34. Manual selecting means 35 selects by manual setting which of the digital signal supplied from processing means 32 or the analog signal supplied from demodulating means 33 is to be input to switch 34. Recording processing means 37 records the digital signal or analog signal selected at switch 34.

Regarding the recording by processing means 37, judging means 36 judges the copyright information transmitted from processing means 32, and if the information has prohibition against digital recording, judging means 36 instructs processing means 37 to prohibit the recording. On the other hand, if the information has permission to record the content, judging means 36 instructs processing means 37 to record the content. Then processing means 37 records the digital signal or analog signal selected at switch 34 to recording medium 38. Reproduction processing means 39 reproduces the signal recorded in medium 38, and transmits the reproduced signal to reproduction signal outputting means 310, which then outputs the reproduced signal.

The conventional structure discussed above, however, cannot record desirable video or audio in a particular case, i.e., selecting means 35 selects a digital signal, in other words, the digital signal is input to switch 34, and when the copyright information judged by judging means 36 has prohibition against digital recording, a record prohibiting instruction is sent to processing means 37. As a result, the desirable video or audio cannot be recorded.

Further, in the condition of selecting a digital signal at selecting means 35, and when a transfer rate of the digital signal is over the maximum transfer rate for digital recording, desirable video or audio is not exactly recorded.

SUMMARY OF THE INVENTION

The present invention addresses the problems discussed above and aims to provide a recording and reproducing apparatus which can record desirable audio or video in an analog form instead of a digital form even if a digital signal is selected by manual-signal-selecting-means and copyright information judged by copyright-information-judging-means has prohibition against digital recording.

Further, a digital signal is selected at manual-signal-selecting-means, and when a transfer rate of the digital signal supplied to copyright-information-judging-means is over the maximum transfer rate for digital recording, the present invention provides a recording and reproducing apparatus which can record desirable audio or video in the analog form instead of the digital form.

The recording and reproducing apparatus of the present invention comprises the following elements:

(a) digital signal inputting means;
(b) digital signal processing means for processing information included in an output from the digital signal inputting means;
(c) digital signal demodulating means for demodulating an output from the digital signal processing means into an analog signal;
(d) copyright information judging means for judging whether or not the content is recordable based on copyright information included in the output from the digital signal processing means;
(e) manual-signal-selecting-means for selecting manually a digital signal or an analog signal as a desirable signal type for recording;

(f) automatic-signal-selecting-means for outputting a selection control signal based on information from the manual-signal-selecting-means and information from the copyright-information-judging-means;

(g) a switch for outputting one of the output from the digital-signal-processing-means or the output from the digital-signal-demodulating-means, based on the selection control signal; and (h) recording processing means for being controlled by an output from the copyright information judging means, and for recording an output from the switch.

In the condition that a digital signal is manually selected for recording, and the copyright information has prohibition against recording in a digital form but has permission to record in an analog form, this structure allows selecting automatically an analog signal for analog recording. Therefore, this structure can avoid the problem of desirable audio or video being not recorded.

Another recording and reproducing apparatus of the present invention comprises the following elements:

(a) digital signal inputting means;

(b) digital signal processing means for processing information included in an output from the digital signal inputting means;

(c) digital signal demodulating means for demodulating an output from the digital signal processing means into an analog signal;

(d) transfer rate judging means for judging whether or not a transfer rate of the output from the digital signal processing means is over the maximum transfer rate for digital recording;

(e) manual-signal-selecting-means for selecting manually a digital signal or an analog signal as a desirable signal type for recording;

(f) automatic-signal-selecting-means for outputting a selection control signal based on information from the manual-signal-selecting-means and information from the transfer-rate-judging-means;

(g) a switch for outputting one of the output from the digital-signal-processing-means or the output from the digital-signal-demodulating-means, based on the selection control signal; and (h) recording processing means for recording an output from the switch.

In the condition that a digital signal is manually selected for recording, and a transfer rate of the digital signal to the transfer-rate-judging-means is over the maximum transfer rate for digital recording, this structure allows analog recording, thereby avoiding the problem of desirable audio or video being not recorded.

DETAILED DESCRIPTION OF EXEMPLARY EMBODIMENTS

Exemplary embodiments of the present invention are demonstrated hereinafter with reference to the accompanying drawings.

First Exemplary Embodiment

Figure 1:
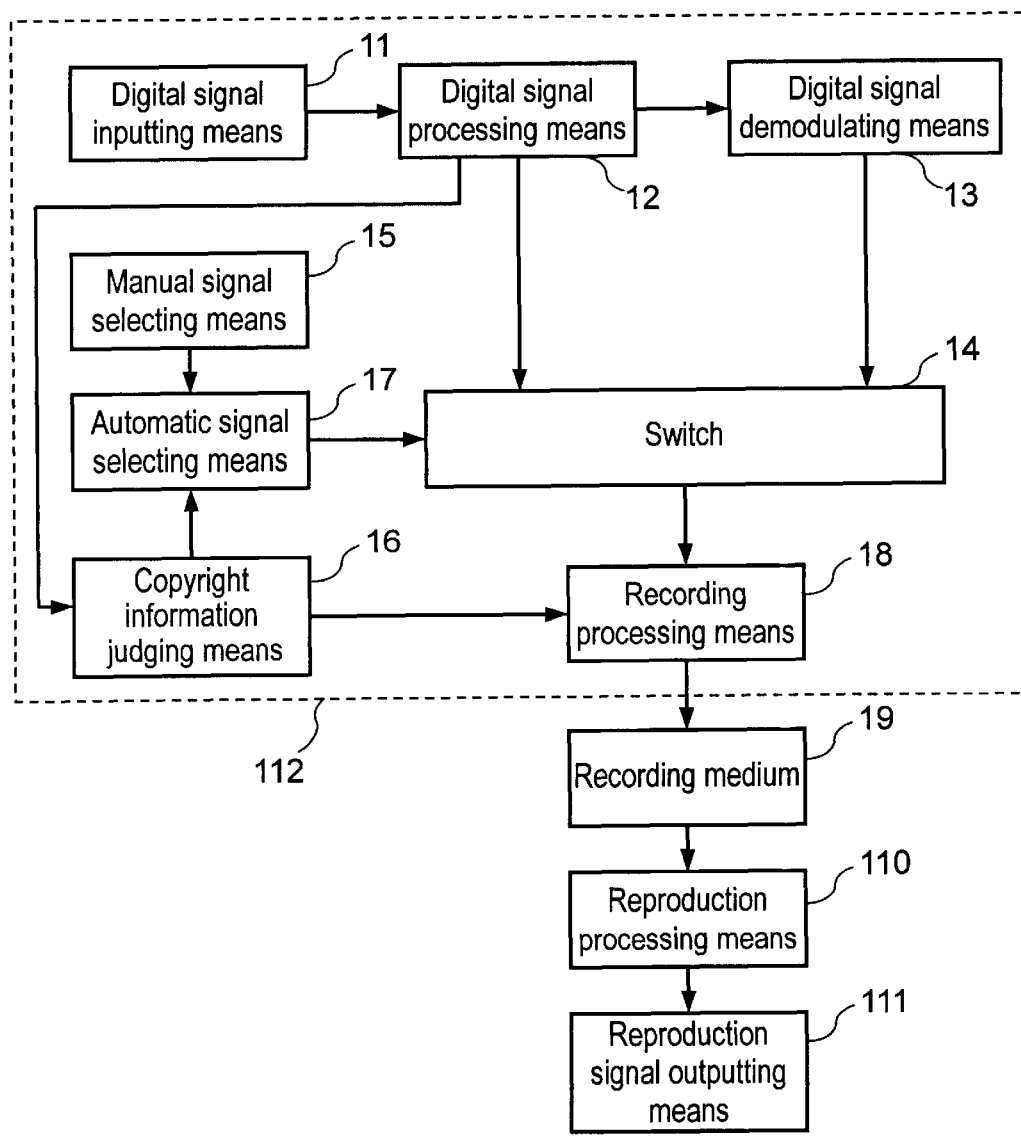
FIG. 1 is a block diagram showing a structure of a recording and reproducing apparatus in accordance with a first exemplary embodiment of the present invention.

FIG. 1 is a block diagram showing a structure of a recording and reproducing apparatus in accordance with the first exemplary embodiment of the present invention, and the apparatus is applicable to both of digital signals and analog signals.

In FIG. 1, digital-signal-inputting-means 11 supplies a digital signal to digital-signal-processing-means 12. In other words, processing means 12 receives the digital signal from inputting means 11 and extracts necessary audio and video signals included in the digital signal, and then outputs them to digital-signal-demodulating-means 13. Demodulating means 13 demodulates the digital audio signal and digital video signal extracted by processing means 12 into analog signals.

Based on copyright information included in an output from processing means 12, copyright-information-judging-means 16 judges whether the information has prohibition against recording or has permission. Manual-signal-selecting-means 15 selects manually a digital signal or an analog signal as a desirable signal type for recording. Automatic-signal-selecting-means 17 receives information both from selecting means 15 and judging means 16, then outputs a selection control signal to switch 14.

This selection control signal controls switch 14 in the following way: Based on the selection control signal, switch 14 selects one of the inputs, i.e., the digital signal from processing means 12 or the analog signal from demodulating means 13, and outputs the selected signal to recording processing means 18.

Processing means 18 is controlled by an output from judging means 16, and records the signal supplied from switch 14. Processing means 18 actually records the signal in recording medium 19. Reproduction processing means 110 reproduces the signal recorded in medium 19. Reproduction-signal-outputting-means 111 outputs the reproduced signal.

Next, an operation of the recording and reproducing apparatus structured above is demonstrated hereinafter.

When a digital signal such as MPEG or DV is supplied from digital-signal-inputting means 11, digital-signal-processing means 12 separates the supplied signal into a digital video signal and a digital audio signal. Meanwhile, MPEG stands for Motion Picture Experts Group, and DV is a format specified by HD digital VCR conference. These digital signals are transmitted to digital-signal-demodulating means 13, where the signals are demodulated into an analog video signal and an analog audio signal. The demodulated analog signal is fed into switch 14. The digital signal transmitted from processing means 12 is also fed into switch 14. The digital signal from processing means 12 is also transmitted to copyright information judging means 16. Judging means 16 judges the copyright information included in the digital signal. In general, the copyright information has the information about permission or prohibition of digital recording as well as permission or prohibition of analog recording independently.

Automatic-signal-selecting means 17 controls switch 14 based on the information selected by manual-signal-selecting means 15 and the information judged by judging means 16, and selects which signal, i.e., the digital signal or analog signal, is to be fed into recording processing means 18 via switch 14.

The selection may be classified into the following four cases:

(1) In the case that a digital signal is selected as a desirable recording signal by selecting means 15, and copyright information includes prohibition against digital recording and permission to record the content in an analog form. In this condition, selecting means 17 automatically instructs switch 14 to select the analog signal.

(2) In the case that an analog signal is selected as a desirable recording signal by selecting means 15, and copyright information includes prohibition against analog recording and permission to record the content in a digital form. In this condition, selecting means 17 automatically instructs switch 14 to select the digital signal.

(3) In the case that a digital signal is selected as a desirable recording signal by selecting means 15, and copyright information includes permission to record the content in a digital form. In this condition, selecting means 17 automatically instructs switch 14 to select the digital signal as it does.

(4) In the case that an analog signal is selected as a desirable recording signal by selecting means 15, and copyright information includes permission to record the content in an analog form. In this condition, selecting means 17 automatically instructs switch 14 to select the analog signal as it does.

Switch 14, which selects the signal as discussed above, supplies an output to recording processing means 18. When processing means 18 receives the digital signal, digital recording is carried out. When processing means 18 receives the analog signal, analog recording is carried out. In order to protect the copyright, processing means 18 is structured to perform as follows based on the instruction from judging means 16.

In the case that the copyright information judged by judging means 16 includes prohibition against digital recording, it is not allowed recording the content in a digital form. When the copyright information includes prohibition against analog recording, it is not allowed recording the content in the analog form. Therefore, when the copyright information shows prohibition against both digital-recording and analog-recording, processing means 18 is prohibited from recording both the signals even if switch 14 supplies the digital signal or the analog signal.

On the other hand, when processing means 18 is allowed recording, a video signal and an audio signal are recorded in recording medium 19. When the recorded video signal and audio signal are reproduced, reproduction processing means 110 reproduces them, and reproduced-signal-outputting means 111 outputs those signals.

In this first exemplary embodiment discussed above, selecting means 17 is provided for selecting a digital signal or an analog signal as an output from switch 14. The selection is carried out based on both of the information selected by selecting means 15 and the copyright information judged by judging means 16. This structure allows digital-recording-prohibitive copyright information to be recorded in the analog form instead of the digital form. Thus the problem of desirable audio or video being not recorded can be overcome.

Section 112 surrounded by broken lines in FIG. 1 can be realized by software processing in a microcomputer.

Second Exemplary Embodiment

Figure 2:
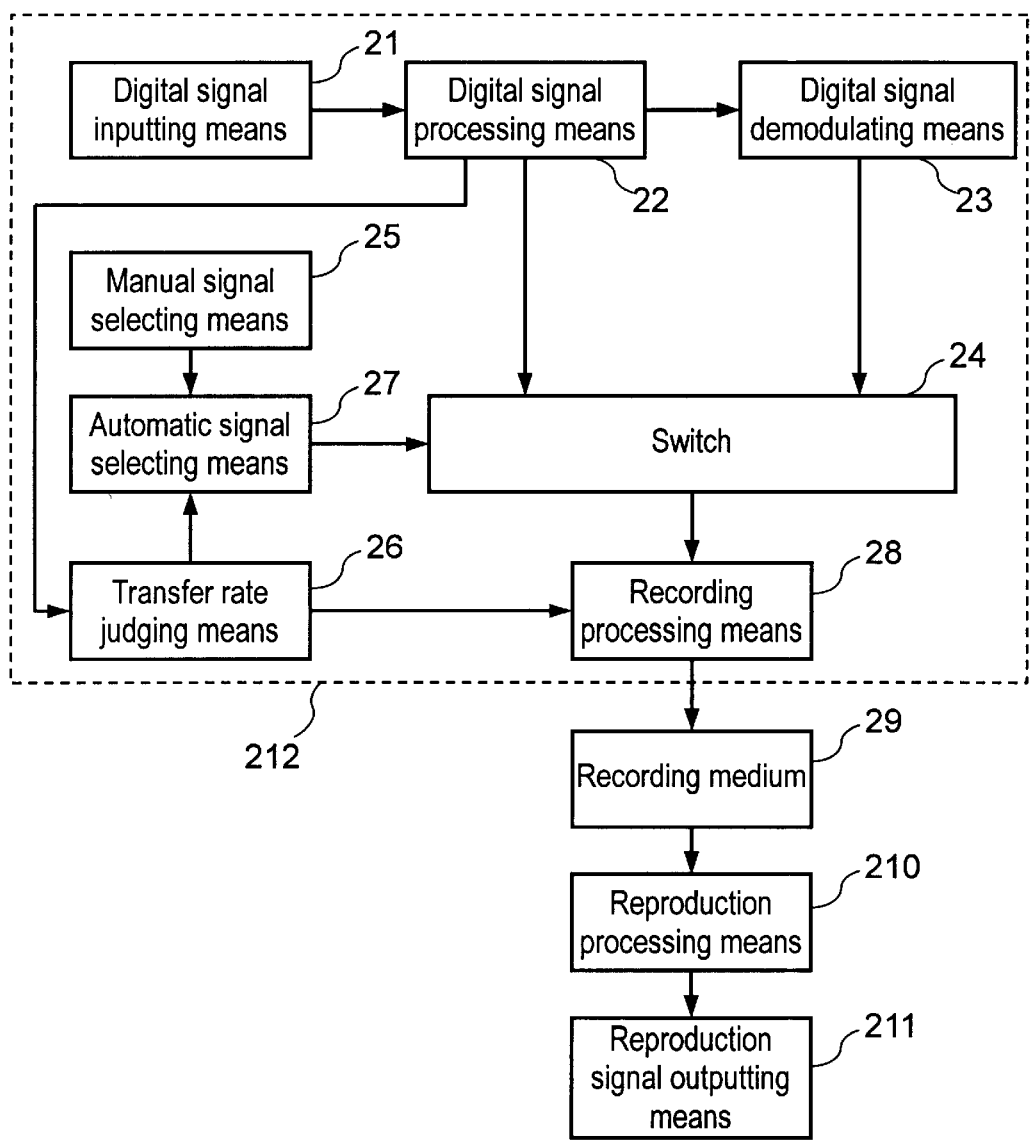
FIG. 2 is a block diagram showing a structure of a recording and reproducing apparatus in accordance with a second exemplary embodiment of the present invention.
Figure 3:
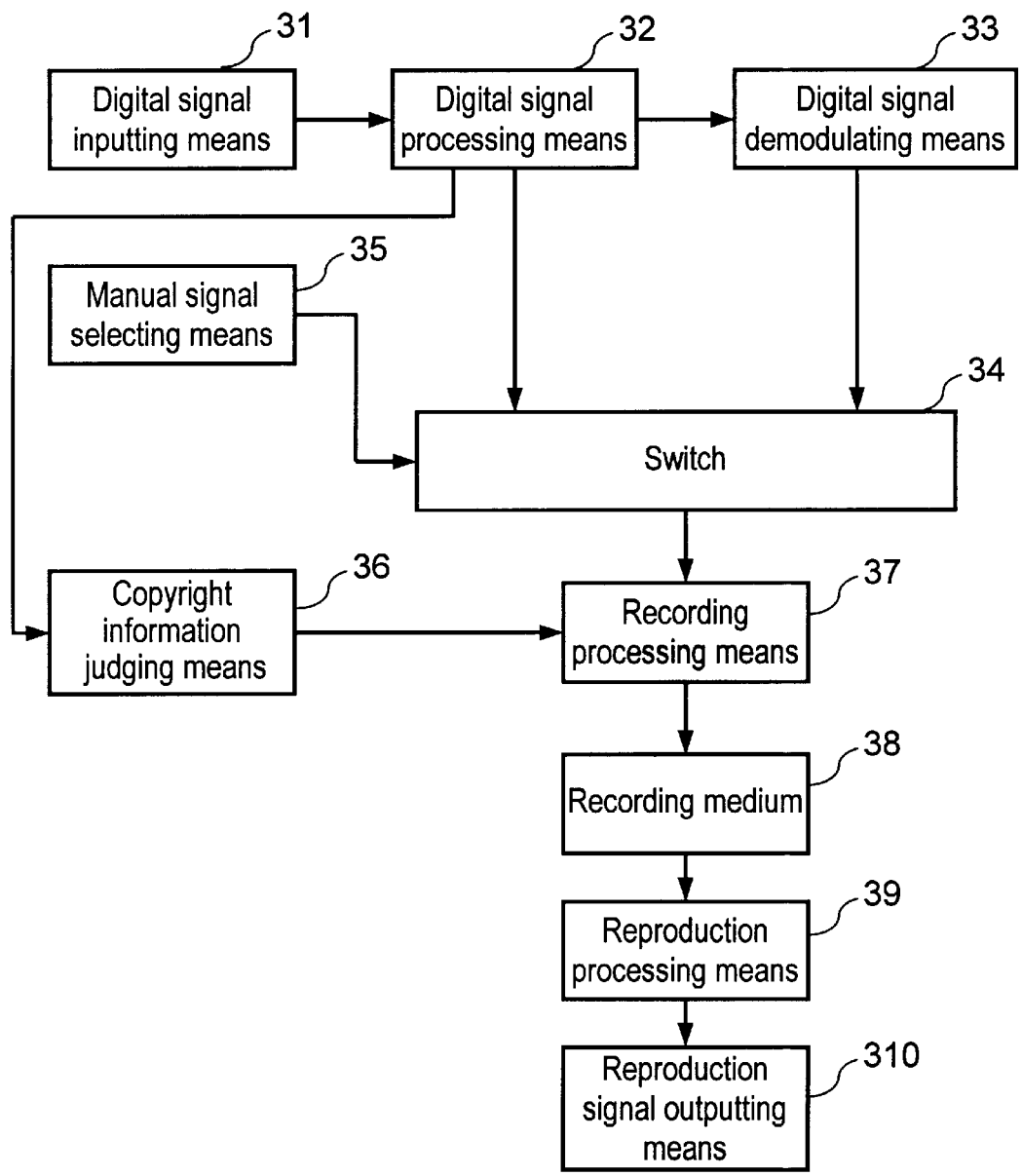
FIG. 3 is a block diagram showing a conventional recording and reproducing apparatus.

FIG. 2 is a block diagram showing a structure of a recording and reproducing apparatus in accordance with the second exemplary embodiment of the present information. The apparatus, as same as the apparatus in the first embodiment, can be applicable to both a digital signal and an analog signal.

In FIG. 2, digital-signal-inputting-means 21 supplies a digital signal to digital-signal-processing-means 22. In other words, processing means 22 receives the digital signal from inputting means 21 and extracts necessary audio and video signals included in the digital signal, and then outputs them to digital-signal-demodulating-means 23. Demodulating means 23 demodulates the digital audio signal and digital video signal extracted by processing means 22 into analog signals.

Transfer-rate-judging-means 26 judges whether or not the transfer rate of an output from processing means 22 is over the maximum transfer rate for digital recording. Manual-signal-selecting-means 25 selects manually a digital signal or an analog signal as a desirable signal for recording. Automatic-signal-selecting-means 27 receives information from selecting means 25 and judging means 26, and outputs a selection control signal to switch 24.

The selection control signal controls switch 24 in the following way: Based on the selection control signal, switch 24 selects one of the inputs, i.e., the digital signal from processing means 22 or the analog signal from demodulating means 23, and outputs the selected signal to recording processing means 28.

Processing means 28 records the signal supplied from switch 24. Processing means 28 practically records the signal in recording medium 29. Reproduction processing means 210 reproduces the signal recorded in medium 29. Reproduction-signal-outputting-means 211 outputs the reproduced signal.

Next, an operation of the recording and reproducing apparatus structured above is demonstrated hereinafter.

When a digital signal similar to that in the first embodiment is supplied from digital-signal-inputting means 21, digital-signal-processing means 22 separates the supplied signal into a digital video signal and a digital audio signal. These digital signals are transmitted to digital-signal-demodulating means 23, where the signals are demodulated into an analog video signal and an analog audio signal. The demodulated analog signal is fed into switch 24. A digital signal transmitted from processing means 22 is also fed into switch 14. The digital signal from processing means 22 is also transmitted to transfer rate judging means 26.

Transfer rate judging means 26 judges whether or not the transfer rate of the supplied digital signal is over the maximum transfer rate for digital recording, and outputs the judging result. Automatic-signal-selecting means 27 controls switch 24 based on both of the information selected by manual-signal-selecting means 25 and the result by judging means 26, and selects which signal, i.e., the digital signal or analog signal, is to be fed into recording processing means 28 via switch 24.

The selection may be classified into the following two cases:

(1) In the case that a digital signal is selected as a desirable recording signal by selecting means 25, and the transfer rate judgment result is over the maximum transfer rate for digital recording (hereinafter referred to as "a greater transfer rate".) In this condition, selecting means 27 automatically instructs switch 24 to select the analog signal.

(2) In the case that an analog signal is selected as a desirable recording signal by selecting means 25, or a digital signal is selected by selecting means 25 and a transfer rate judgement results in less than the maximum transfer rate for digital recording (hereinafter referred to as "a smaller transfer rate".) In this condition, selecting means 27 automatically instructs switch 24 to select the signal selected by selecting means 25.

When processing means 28 receives the digital signal, digital recording is carried out. When processing means 28 receives the analog signal, analog recording is carried out. When recording processing means 28 records information, a video signal and an audio signal are recorded in recording medium 29. When the recorded video signal and audio signal are reproduced, reproduction processing means 210 reproduces them, and reproduced-signal-outputting means 211 outputs those signals.

When an output from digital signal processing means 22 includes copyright information, transfer rate judging means 26 shown in FIG. 2 can be structured to judge the transfer rate of a digital signal of the copyright information. The second embodiment illustrated in FIG. 2 may further include copyright-information-judging-means which includes transfer-rate-judging-means 26. In this case, the copyright information judging means receives the copyright information from digital signal processing means 22, and judges the transfer rate of the digital signal of the copyright information with transfer-rate-judging-means 26.

In this second exemplary embodiment discussed above, selecting means 27 is provided for selecting a digital signal or an analog signal as an output from switch 24. The selection is carried out based on the information selected by selecting means 25 and the transfer rate judgement result judged by judging means 26. When selecting means 25 selects a digital signal and transfer-rate-judging-means 26 receives a digital signal having "a greater transfer rate", this structure allows the digital signal to be recorded in an analog form instead of a digital form. Thus the problem of desirable audio or video being not exactly recorded can be overcome.

Section 212 surrounded by broken lines in FIG. 2 can be realized by software processing in a microcomputer.

What is claimed is:

1. A recording and reproducing apparatus comprising:
   (a) digital signal inputting means;
   (b) digital signal processing means for processing information included in an output from said digital signal inputting means;
   (c) digital signal demodulating means for demodulating an output from said digital signal processing means into an analog signal;
   (d) copyright information judging means for judging whether recording is prohibited or allowed based on copyright information included in the output from said digital signal processing means;
   (e) manual signal selecting means for selecting manually one of a digital signal and an analog signal as a desirable recording signal;
   (f) automatic signal selecting means for outputting a selection control signal based on information supplied from said manual signal selecting means and information supplied from said copyright information judging means, and if said digital signal is selected manually by said manual signal selecting means and said copyright information judging means judges that digital recording is prohibited, said automatic signal selecting means selects an analog signal;
   (g) a switch for selecting one of the output from said digital signal processing means and an output from said digital signal demodulating means based on the selection control signal, and for outputting selected information; and
   (h) recording processing means controlled by an output from said copyright information judging means, said recording processing means for recording an output from said switch.

2. A recording and reproducing apparatus comprising:
   (a) digital signal inputting means;
   (b) digital signal processing means for processing information included in an output from said digital signal inputting means;
   (c) digital signal demodulating means for demodulating an output from said digital signal processing means into an analog signal;
   (d) transfer rate judging means for judging whether or not a transfer rate of the output from said digital signal processing means is over a maximum transfer rate for digital recording;
   (e) manual signal selecting means for selecting manually one of a digital signal and an analog signal as a desirable recording signal;
   (f) automatic signal selecting means for outputting a selection control signal which indicates whether at least one of (a) digital recording is to occur and (b) analog recording is to occur based on information supplied from said manual signal selecting means and information supplied from said transfer rate judging means; said automatic signal selecting means for selecting an analog signal when said digital signal is selected by said manual signal selecting means and said transfer rate judging means judges that the transfer rate is over the maximum transfer rate;
   (g) a switch for selecting one of the output from said digital signal processing means and an output from said digital signal demodulating means based on the selection control signal, and for outputting selected information; and
   (h) recording processing means for recording an output from said switch.

3. The recording and reproducing apparatus as defined in claim 2, wherein said transfer rate judging means judges a transfer rate of a digital signal of copyright information included in the output from said digital signal processing means.

4. The recording and reproducing apparatus as defined in claim 2 further comprising;
   copyright information judging means which includes said transfer rate judging means,
   wherein said copyright information judging means receives copyright information supplied from said digital signal processing means as well as judges a transfer rate of a digital signal of the copyright information by using said transfer rate judging means.

* * * * *